US 8,548,976 B2

(12) United States Patent
Betts et al.

(10) Patent No.: US 8,548,976 B2
(45) Date of Patent: Oct. 1, 2013

(54) BALANCING LOAD REQUESTS AND FAILOVERS USING A UDDI PROXY (75) Inventors: Christopher Betts, Mount Dandenong (AU); Tony Rogers, Rowville (AU)

(73) Assignee: CA, Inc., Islandia, NY (US)

( * ) Notice: Subject to any disclaimer, the term of this patent is extended or adjusted under 35 U.S.C. 154(b) by 2597 days.

(21) Appl. No.: 11/132,649

(22) Filed: May 19, 2005

(65) Prior Publication Data
US 2005/0283539 A1 Dec. 22, 2005

Related U.S. Application Data (60) Provisional application No. 60/573,450, filed on May 21, 2004.

(51) Int. Cl.
G06F 7/00 (2006.01)
G06F 17/30 (2006.01)

(52) U.S. Cl.
USPC .......................................... 707/709; 709/245

(58) Field of Classification Search
USPC .................................. 707/709, 245
See application file for complete search history.

(56) References Cited

U.S. PATENT DOCUMENTS

| 7,308,475 | B1 * | 12/2007 | Pruitt et al. | 709/203 |
| 2003/0105846 | A1 | 6/2003 | Zhao et al. | 709/221 |
| 2003/0191802 | A1 | 10/2003 | Zhao et al. | 709/203 |

FOREIGN PATENT DOCUMENTS

| WO | WO 03/063009 A1 | 7/2003 |
| WO | WO 03/077156 A1 | 9/2003 |
| WO | WO 2004/021234 A1 | 3/2004 |

OTHER PUBLICATIONS

Tsai, W.T., et al., "*Verification of Web Services Using an Enhanced UDDI Server*", Object-Oriented Real-Time Dependable systems, 2003, Proceedings of the 8th International Workshop, Piscataway, NJ, XP010648743, (8 pages), Jan. 15, 2003.
Damelin, J., "*UDDI on MS Windows Server 2003*", MSDN Developer Roadshow, 'Online!, XP002348861, (40 pages), Jul. 10, 2003.
Notification of Transmittal of the International Search Report and the Written Opinion of the International Searching Authority for International Application No. PCT/US2005/017785, filed May 19, 2005, (12 pages), Nov. 3, 2005.

* cited by examiner

*Primary Examiner* — Cam Truong
(74) *Attorney, Agent, or Firm* — Baker Botts, LLP (57) ABSTRACT

A method for connecting to a web service includes selecting a web service, selecting a server among one or more servers capable of running the selected web service, determining a real address for the selected web service running on the selected server and connecting to the selected web service running on the selected server using the determined real address.

27 Claims, 7 Drawing Sheets

BALANCING LOAD REQUESTS AND FAILOVERS USING A UDDI PROXY

REFERENCE TO RELATED APPLICATION

The present disclosure is based on and claims the benefit of Provisional Application Ser. No. 60/573,450 filed May 21, 2004, the entire contents of which are herein incorporated by reference.

BACKGROUND

1. Technical Field

The present disclosure relates to balancing load requests and failovers, more specifically, to balancing load requests and failovers using a UDDI proxy.

2. Description of the Related Art

Web services are quickly transforming the way modern businesses interact and share information. Web services are software systems that can be identified by Universal Resource Identifiers (URI) in a fashion that is analogous to the way websites may be identified by Uniform Resource Locators (URLs). Web services generally contain public interfaces and bindings that enable users and other software systems such as other web services to seamlessly utilize the functionality of the web services. In this way, web services enhance the way computers communicate with users and each other.

To enable the vast variety of computer systems to communicate with each other, cross-platform programming languages have been developed. A popular example of one such computer language is Extensible Markup Language (XML). Many web services communicate using instructions written in XML.

However, before a software system can utilize the functionality of a web service, the software system should first be able to locate and connect to the web service. The process of locating and connecting to a web service is known as discovery and integration. To facilitate discovery and integration, the Universal Description, Discovery and Integration (UDDI) standards have been adopted.

UDDI consists of a standardized vocabulary for detecting and describing the functionality of web services. UDDI also provides for UDDI repositories which are generally directories where information pertaining to a business, its services, technical information, and information about specifications for the business's web services can be looked up.

Web services may be made available to a large number of potential users. These users may access the web services via a local area network or a wide area network. For example, web services may be made available over the Internet. Web services may therefore be made available to potential users world wide. Because web services communicate using cross platform communication languages, web services may be accessible to users and software systems operating on a wide variety of platforms. Additionally, web services may utilize the unicode text format to allow web services to interact with users and software systems located in countries throughout the world regardless of the language spoken in those countries.

Because of the very large number of potential web service users and the complexity of many web services, web services can push even the most capable servers running the web services to their limits. Web service use is often referred to as load. Servers that run web services generally have a load capacity indicating the quantity of load the server can handle. Servers that may be over loaded may not be able to function properly. For example, an over loaded server may stop handling requests for web services. An overloaded server may also cease functioning, thereby denying all web service requests.

One option for handling the problem of excess load is to use more powerful servers to run the web services. More powerful servers may be able to handle more simultaneous requests for web services and/or web services requiring more rigorous computation. This potential solution is limited. For example, the great number of users of a web service may overload even the most powerful servers. Additionally, more powerful servers may be disproportionably more expensive. For example, a server that is marginally more powerful may be substantially more expensive.

Another option is to load balance. Load balancing involves using more than one server to run the same web service. The load may then be spread among multiple servers all working towards processing web service requests. There are many techniques for spreading load among multiple servers. These various techniques employ various distributed scheduling algorithms to allocate requests among the available servers.

Distributed scheduling algorithms may be static, dynamic or preemptive. Static algorithms allocate requests to servers at run time without taking into account the current load at the various servers. One example of a static algorithm is round robin. Here, requests may be allocated to each server in turn. Another example of a static algorithm is random selection. Here, requests may be allocated to a server selected at random with each server having an equal probability of receiving the next request. Static algorithms may also be modified to account for varying capabilities of the available servers. For example, the round robin algorithm may be modified to allocate additional requests to high-capacity servers. For example, the random selection algorithm may be modified to give high-capacity servers a greater probability of receiving the next request.

Dynamic algorithms may take into account the current load volume in each server before allocating a request. Dynamic algorithms may allocate requests to the most capable server available at the time the request is received. For example, a request might be sent to the server with the smallest load. Load level may be determined, for example, by using the Web Services Distributed Management (WSDM) protocol. Such algorithms have the advantage of potentially making more efficient use of available resources thereby potentially reducing the amount of servers required and/or increasing the speed at which requests may be processed.

Preemptive algorithms may be able to migrate a request that is currently being processed from one server to another where it may be deemed beneficial. Such algorithms have the potential to make even more efficient use of computational resources.

As mentioned above, excess load may be able to render a web service server inoperable. Therefore, another option for handling the problem of excess load is to use a failover. A failover may be a redundant or standby server that can automatically take over for the primary server in the event the primary server fails. Failover servers may be referred to as "hot standby" or "warm standby" servers. The use of a failover allows for the web service to continue handling requests even in the event of a server malfunction, for example, the failover server (secondary server) may take over for the primary server when excess load causes the primary server to fail. However, the usefulness of the failover server is not limited to handling problems associated with excess load. Failovers may be used to ensure the continued offering of web services in any number of circumstances that may render the primary server non-functional.

SUMMARY

A method for connecting to a web service, the method including selecting a web service, selecting a server among one or more servers capable of running the selected web service, determining a real address for the selected web service running on the selected server, and connecting to the selected web service running on the selected server using the determined real address.

A system for connecting to a web service including a web service-selecting unit for selecting a web service, a server-selecting unit for selecting a server among one or more servers capable of running the selected web service, a determining unit for determining a real address for the selected web service running on the selected server, and a connecting unit for connecting to the selected web service running on the selected server using the determined real address.

A computer system including a processor, and a computer recording medium including computer executable code executable by the processor for connecting to a web service, the computer executable code comprising code for selecting a web service, code for selecting a server among one or more servers capable of running the selected web service, code for determining a real address for the selected web service running on the selected server, and code for connecting to the selected web service running on the selected server using the determined real address.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

As described above, UDDI repositories may be used to help users and software systems locate and utilize available web services. According to embodiments of the present disclosure, UDDI repositories may additionally be used to manage web service load. For example, a UDDI repository according to one embodiment of the present disclosure may be able to perform load balancing. For example, a UDDI repository according to one embodiment of the present disclosure may be able to initiate a failover.

Figure 1:
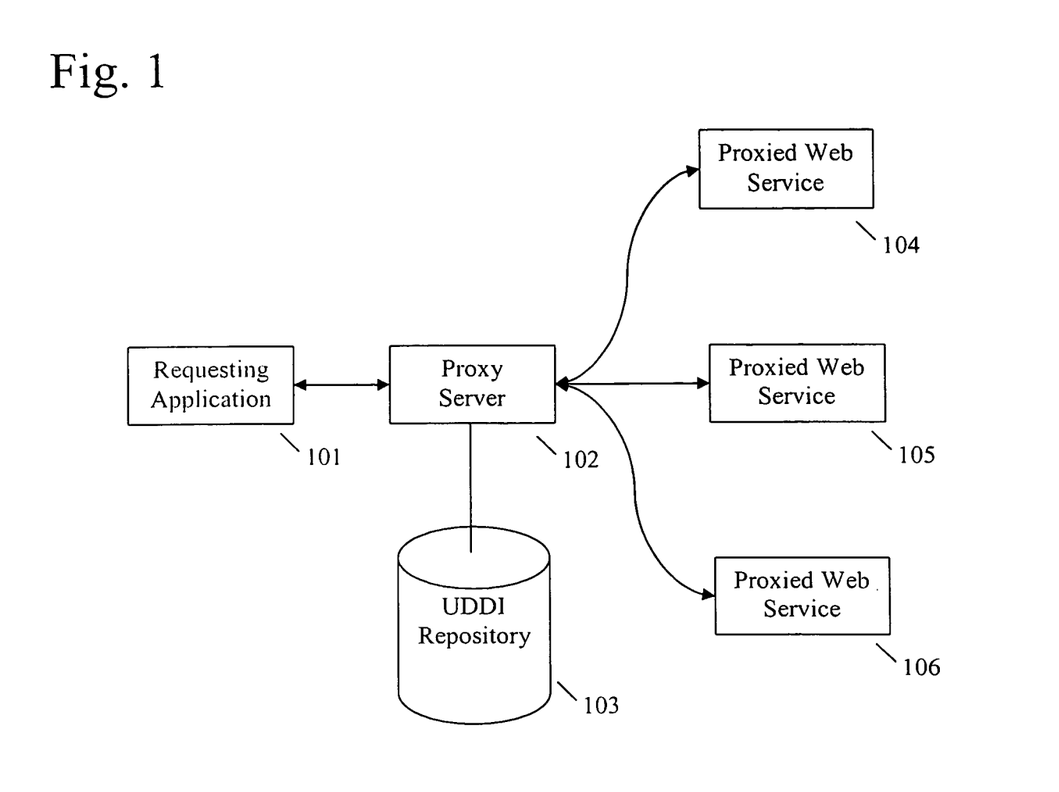
FIG. 1 illustrates a proxied UDDI repository for balancing load requests and failovers according to an embodiment of the present disclosure.

FIG. 1 illustrates a proxied UDDI repository for balancing load requests and failovers according to an embodiment of the present disclosure. Here, a user or a software application (requesting application) 101 may desire to utilize a web service. A UDDI repository proxy server (proxy) 102 may assist the requesting application 101 in determining a suitable web service from among all available web services 104-106. Although only three web services are shown, it will be appreciated that there may be any number of web services available. The proxy 102 may utilize a UDDI repository 103 in making this selection. After a suitable web service has been selected, load balancing and/or failovers may occur as described below. The proxy 102 may then access the suitable web service on behalf of the requesting application 101.

The proxy 102 may be maintained by an organization that provides web services to facilitate the web services' use by potential users. Where the proxy 102 is so maintained, the proxy 102 is sometimes said to be in 'reverse' mode. Alternatively, the proxy 102 may be maintained by an organization that makes use of web services to facilitate the use of various web services by the organization's constituents. Where the proxy is so maintained by the user of the web services, the proxy 102 may be said to be used in 'normal' mode.

Figure 2:
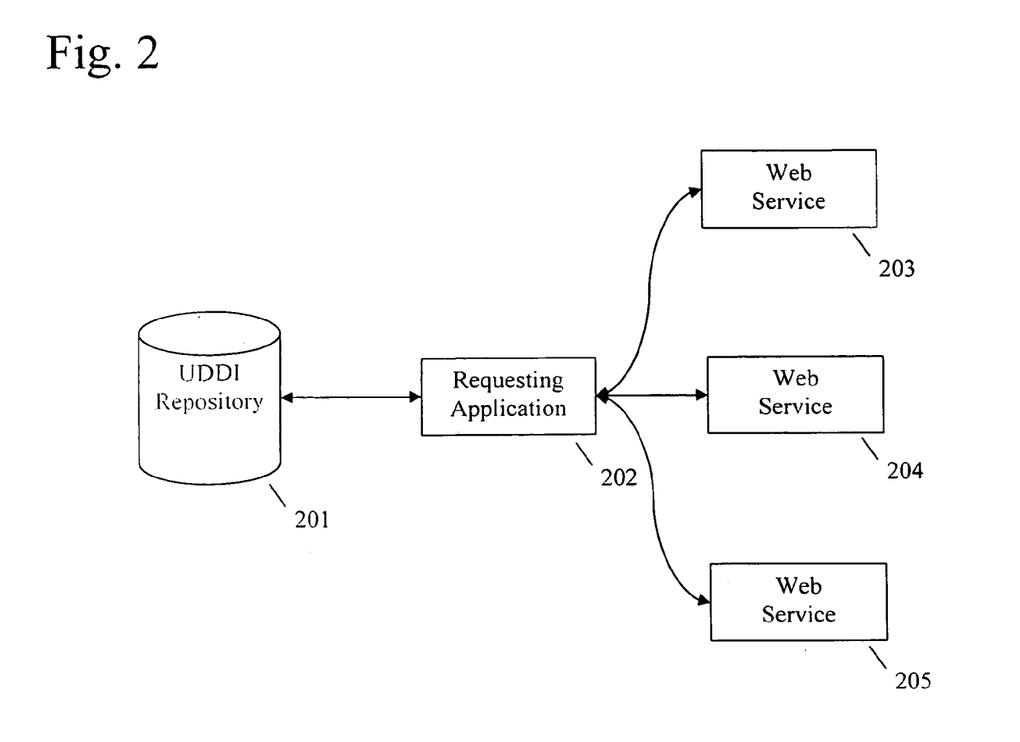
FIG. 2 illustrates a non-proxied UDDI repository balancing load requests and failovers according to an embodiment of the present disclosure.

Not all embodiments of the present disclosure involve proxies. For example, FIG. 2 illustrates a non-proxied UDDI repository balancing load requests and failovers according to an embodiment of the present disclosure. Here, the requesting application 202 may desire to utilize a web service. The requesting application 202 may communicate directly with a UDDI repository 201 to determine a suitable web service from among all available web services 203-205. After a suitable web service has been selected, load balancing and/or failovers may occur as described below. The requesting application may then obtain connection details from the UDDI repository 201 that will allow the requesting application 202 to directly access the suitable web service.

Figure 3:
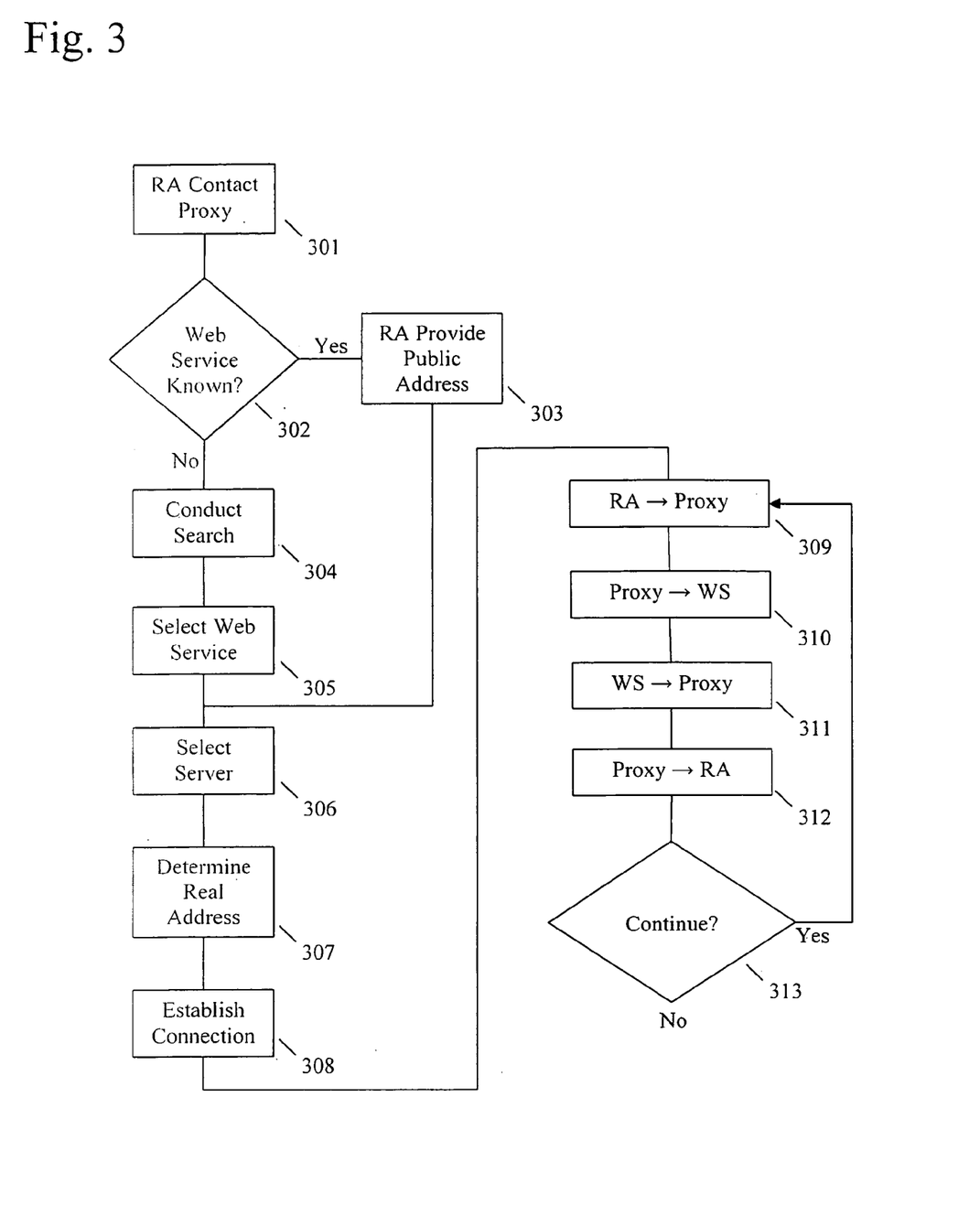
FIG. 3 is a flowchart showing a proxied UDDI repository for balancing load requests according to an embodiment of the present disclosure.

FIG. 3 is a flowchart for describing a proxied UDDI repository for balancing load requests according to an embodiment of the present disclosure. Where a UDDI repository proxy (proxy) is used, the requesting application 101 may contact the proxy (Step S301) to utilize a web service. The requesting application 101 need not know what web service would be appropriate to utilize or precisely where to find that appropriate web service. The requesting application 101 may desire to use a particular web service (Yes Step S302) or may want to search for a suitable web service from among all available web services 104-106 (No Step S302).

Where the requesting application 101 desires to use a particular web service (Yes Step S302), the requesting application 101 may provide the proxy 102 with a public address for the desired web service (Step S303). A public address may be an identifier that can be used to select a specific web service. For example, the public address may be a web service name. For example, the public address may be a real address for a web service. The public address may be made available to the public but need not be the actual address of the web service. The proxy 102 will determine the actual address to use for a given public address as described below.

The proxy 102 may be a server maintained by a party managing one or more web services, the proxy 102 may be a server maintained by the party requesting the web service and/or the proxy 102 may be a public directory maintained by a third party. The proxy 102 may be accessible from a computer network, for example, the Internet.

Where the requesting application 101 seeks to ascertain an appropriate web service to use (No Step S302), the requesting application 101 may provide the proxy 102 with information that may help the proxy 102 determine an appropriate web service to meet the need of the requesting application 101. This information may include, for example, a name of a web service, a task for the web service to perform, how data should be presented to the web service, details about the company that provides the web service, etc. The proxy 102 may then search a UDDI repository 103 to identify an appropriate web service (Step S304). This search may be, for example, a search based on keywords where each available web service lists keywords that describe its function/s. Searches may also be more sophisticated, taking advantage of known techniques for searching.

The search may also consist of looking up a web service in an index of web services, similar to the way a person might look up a phone number in a phonebook. Such indexes may allow for yellow pages type search, where the requesting application 101 may identify an appropriate web service using a set of web service descriptions organized topically.

In choosing an appropriate web service, the requesting application 101 may consider such factors as, for example, the function of the web service, the speed of the web service, the price of using the web service, the amount of bandwidth available to the web service, and prior commercial arrangements with the entity providing the web service, etc.

The requesting application 101 may select an appropriate web service (Step S305) by using the search results from the search (Step S304) to select a web service. After an appropriate web service has been selected, either by providing a public address (Step S303) or by using the search results from the search (Step S305), the proxy 102 may determine the number of servers that may be available to run the selected web service by retrieving this information from the UDDI repository 103. The proxy 102 may then select the appropriate server running the selected web service to perform the selected web service (Step S306). Where only one server may be available to perform the selected web service, that server will be selected. Where there are multiple servers available to perform the given web service, the proxy 102 may perform one or more distributed scheduling algorithms, as described above, to select a server to perform the given web service.

After a server has been selected (Step S306), the proxy 102 may look up the real address for the selected web service running on the selected server (web service/server combination) from the UDDI repository 103 (Step S307). The real address may be an address that can be used to form a connection with the web service/server combination. The real address may be, for example, a precise URI that can be used to locate the web service/server combination on a network, for example, on the Internet. The real address may be, for example, conveyed in the form of a binding. A binding may be an identifier that may be used to establish a connection between a server and client.

The proxy 102 may then establish a connection with the selected web service/server combination using the real address (Step S308). Using this connection, the requesting application 101 can communicate with the selected web service using the proxy 102 as an intermediary. For example, the requesting application 101 can send an instruction to the proxy 102 (Step S309). The proxy 102 can then send the instruction to the selected web service on the requesting application's 101 behalf (Step S310). The web service may then send results back to the proxy 102 (Step S311) and the proxy 102 can then send the results back to the requesting application 101 (Step S312). This may continue for as long as the requesting application 101 desires to utilize the web service (Step S313). Instructions and results may be encapsulated and transmitted, for example, using Simple Object Access Protocol (SOAP) as defined by the XML standard.

Figure 4:
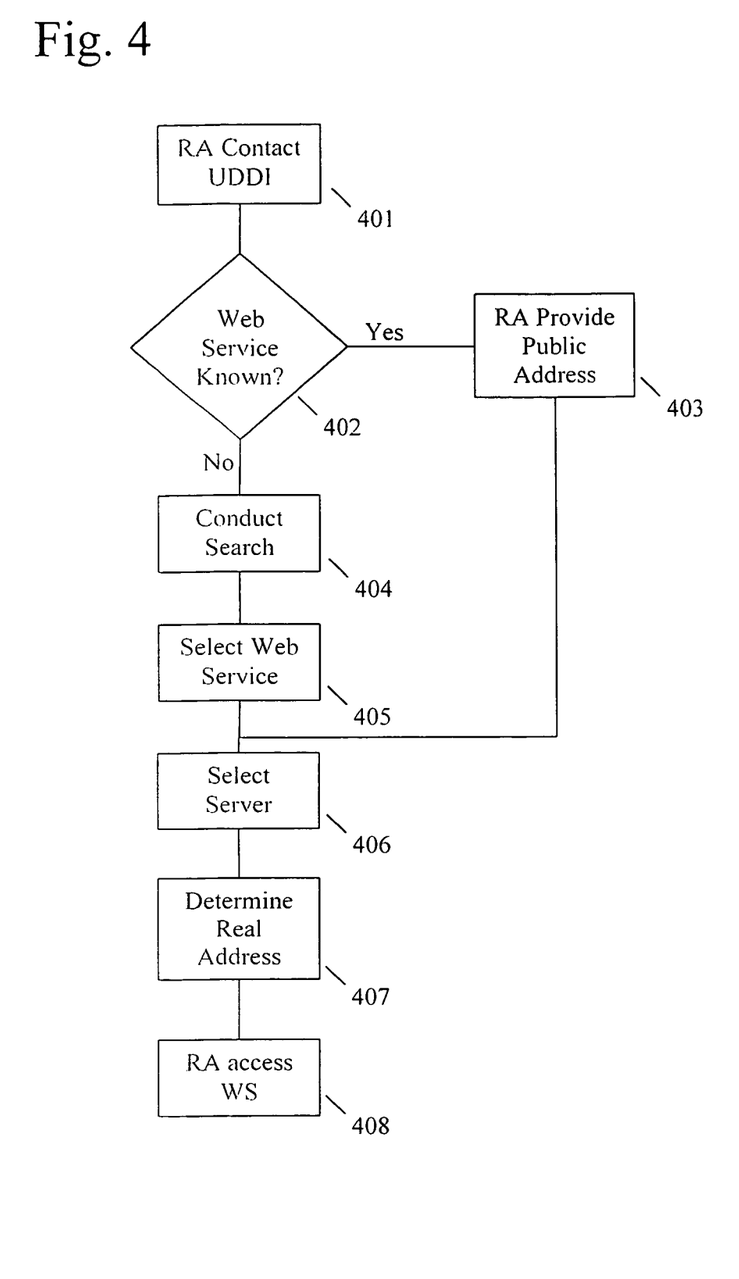
FIG. 4 is a flowchart showing a non-proxied UDDI repository for balancing load requests according to an embodiment of the present disclosure.

FIG. 4 is a flowchart showing a non-proxied UDDI repository for balancing load requests according to an embodiment of the present disclosure. Where a UDDI repository proxy (proxy) is not used, the requesting application 202 may contact the UDDI repository 201 directly (Step S401) to utilize a web service. If the requesting application 202 desires to use a specific web service (Yes Step S402) then the requesting application 202 can provide the web service's public address (Step S403) so the UDDI repository 201 may select a suitable server for running the web service (Step S406).

If the requesting application 202 does not know which web service to use (No Step S402), the requesting application 202 can use the UDDI repository 201 to conduct a search for a suitable web service (Step S404) and then use the search results to select a suitable web service (Step S405).

The UDDI repository 201 may then perform one or more distributed scheduling algorithms, as described above, to select a server to perform the given web service (Step S406). After a server has been selected (Step S406), the requesting application 202 may look up the real address for the web service/server combination from the UDDI repository 201 (Step S407). For example, the UDDI repository 201 may obtain bindings necessary to connect with the selected web service/server combination. The requesting application 202 may then use the obtained bindings to establish a direct connection with the web service/server combination to utilize the web application (Step S408).

Figure 5:
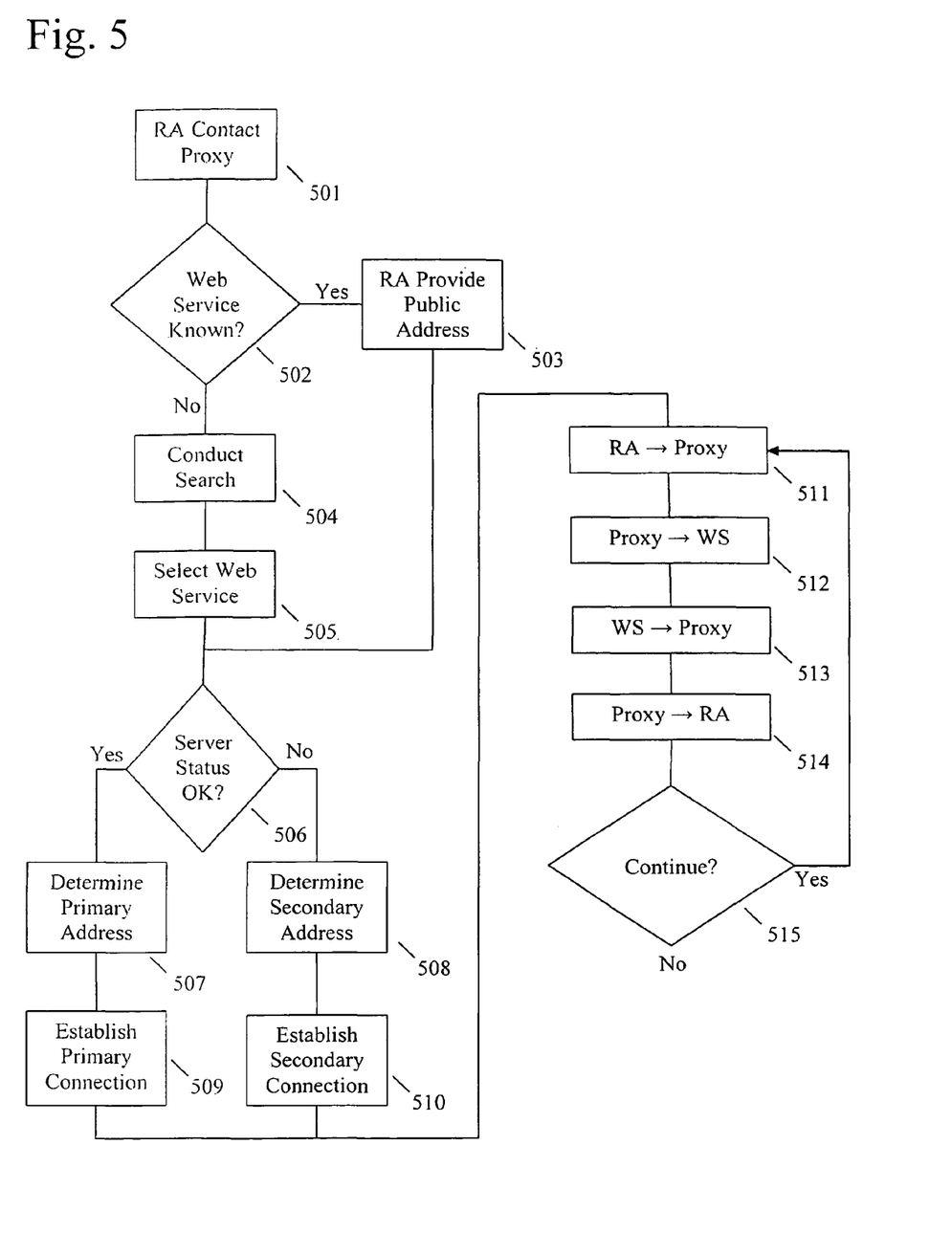
FIG. 5 is a flowchart showing a proxied UDDI repository capable of failover according to an embodiment of the present disclosure.

FIG. 5 is a flowchart showing a proxied UDDI repository capable of failover according to an embodiment of the present disclosure. Where a proxy 102 is used, the requesting application 101 may contact the proxy (Step S501) to utilize a web service. The requesting application 101 may desire to use a particular web service (Yes Step S502) or may want to search for a suitable web service from among all available web services 104-106 (No Step S502).

Where the requesting application 101 desires to use a particular web service (Yes Step S502), the requesting application 101 may provide the proxy 102 with a public address for the desired web service (Step S503). The proxy 102 will determine the actual address to use for a given public address as described below.

Where the requesting application 101 seeks to ascertain an appropriate web service to use (No Step S502), the requesting application 101 may then use the proxy 102 to search the UDDI repository 103 for an appropriate web service (Step S504) and then may select an appropriate web service (Step S505) by using the search results from the search (Step S504).

The proxy 102 may be made aware of the current state of the server on which the web service is primarily run (the primary server) (Step S506). This primary server may either be functional (Yes Step S506) or non-functional (No Step S506). To accomplish this, the proxy 102 may, for example, attempt to establish a connection with the server running the web service. For example, the proxy 102 may access a web service status service (either on the same server or on a different server) that indicates whether the primary web service server may be functioning correctly. Alternatively, the proxy 102 may be made aware of the status of a web service server by receiving feedback from a previous requesting application 101. Alternatively, the server may be given the capability of notifying the proxy 102 in the event that the server may not be properly functioning.

The proxy 102 may then determine the real address to use for the selected web service. Where the primary server is functioning correctly (Yes Step S506), the proxy 102 may look tip the real address for the web service running on the primary server from the UDDI repository 103 (Step S507). Where the primary server is not functioning correctly (No Step S506), the proxy 102 may look up the real address for the web service running on the secondary web server from the UDDI repository 103 (Step S508).

When the proxy 102 is aware that the web service server is properly functioning, the proxy 102 may establish a connection with the web service on the primary server using the determined real address on the requesting application's 101 behalf (Step S509).

When the proxy 102 is aware that the web service server is not properly functioning, the proxy 102 may not establish a connection with the non-functional primary web service on the requesting application's 101 behalf. The proxy 102 may instead establish a connection with the secondary server that may be capable of performing the same web service (Step S510). This secondary web service may be a server that the proxy 102 routinely connects to, for example, in the case above where multiple servers may be made available to perform the given web service. This secondary web service may alternatively be a hot standby server that the proxy 102 only establishes a connection to when the primary server is not properly functioning. In this way, a failover may be utilized by the proxy 102 associated with the UDDI repository.

In this way, the requesting application 101 need not be made aware that it is accessing a replacement server and the business maintaining the servers may thereby prevent users from knowing about server failures.

Using the connection, the requesting application 101 can communicate with the selected web service using the proxy 102 as an intermediary. For example, the requesting application 101 can send an instruction to the proxy 102 (Step S511). The proxy 102 can then send the instruction to the selected web service on the requesting application's 101 behalf (Step S512). The web service may then send results back to the proxy 102 (Step S513) and the proxy 102 can then send the results back to the requesting application 101 (Step S514). This may continue for as long as the requesting application 101 desires to utilize the web service (Step S515).

Figure 6:
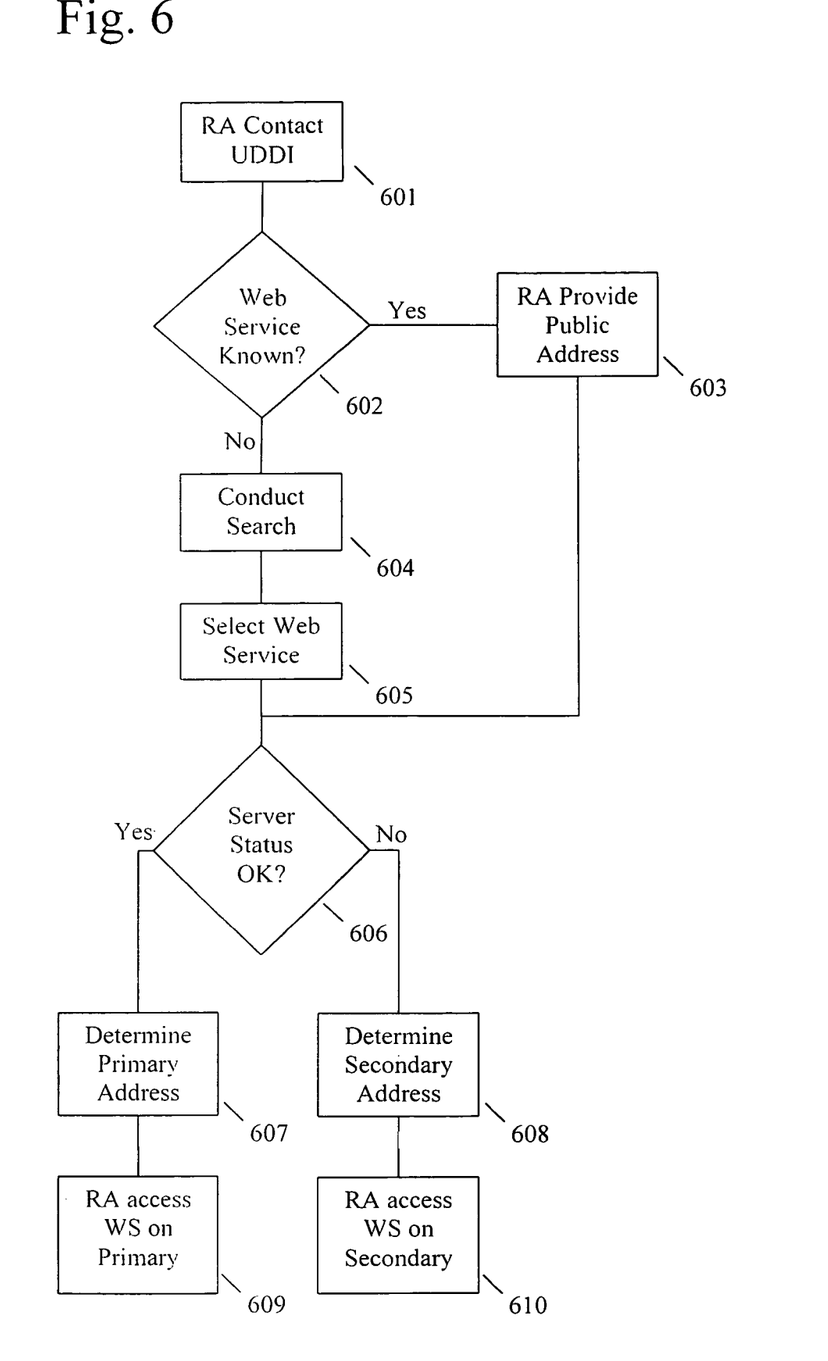
FIG. 6 is a flowchart showing a non-proxied UDDI repository capable of failover according to an embodiment of the present disclosure.

FIG. 6 is a flowchart showing a non-proxied UDDI repository capable of failover according to an embodiment of the present disclosure. Where a proxy is not used, the requesting application 202 may contact the UDDI repository 201 directly (Step S601) to utilize a web service. If the requesting application 202 desires to use a specific web service (Yes Step S602) then the requesting application 202 can provide the web service's public address (Step S603) so the UDDI repository 201 may select a suitable server for running the web service. If the requesting application 202 does not know which web service to use (No Step S602), the requesting application 202 can use the UDDI repository 201 to conduct a search for a suitable web service (Step S604) and then use the search results to select a suitable web service (Step S605).

The UDDI repository 201 may be made aware of the current state of the server on which the web service is primarily run (Step S606). This primary server may either be functional (Yes Step S606) or non-functional (No Step S606). To accomplish this, the UDDI repository 201 may use the techniques discussed above.

The requesting application 202 may then determine the real address to use for the selected web service by referring to the UDDI repository 201. Where the primary server is functioning correctly (Yes Step S606), the requesting application 202 may look up the real address for the web service running on the primary server from the UDDI repository 201 (Step S607). For example, the requesting application 202 may obtain the bindings necessary to connect with the web service running on the primary server. The requesting application 202 may then use the obtained bindings to establish a direct connection with the web service running on the primary server to utilize the web service (Step S609).

Where the primary server is not functioning correctly (No Step S606), the requesting application 202 may look up the real address for the web service running on the secondary web server from the UDDI repository 201 (Step S608). For example, the requesting application 202 may obtain the bindings necessary to connect with the web service running on the secondary server. The requesting application 202 may then use the obtained bindings to establish a direct connection with the web service running on the secondary server to utilize the web service (Step S610).

Figure 7:
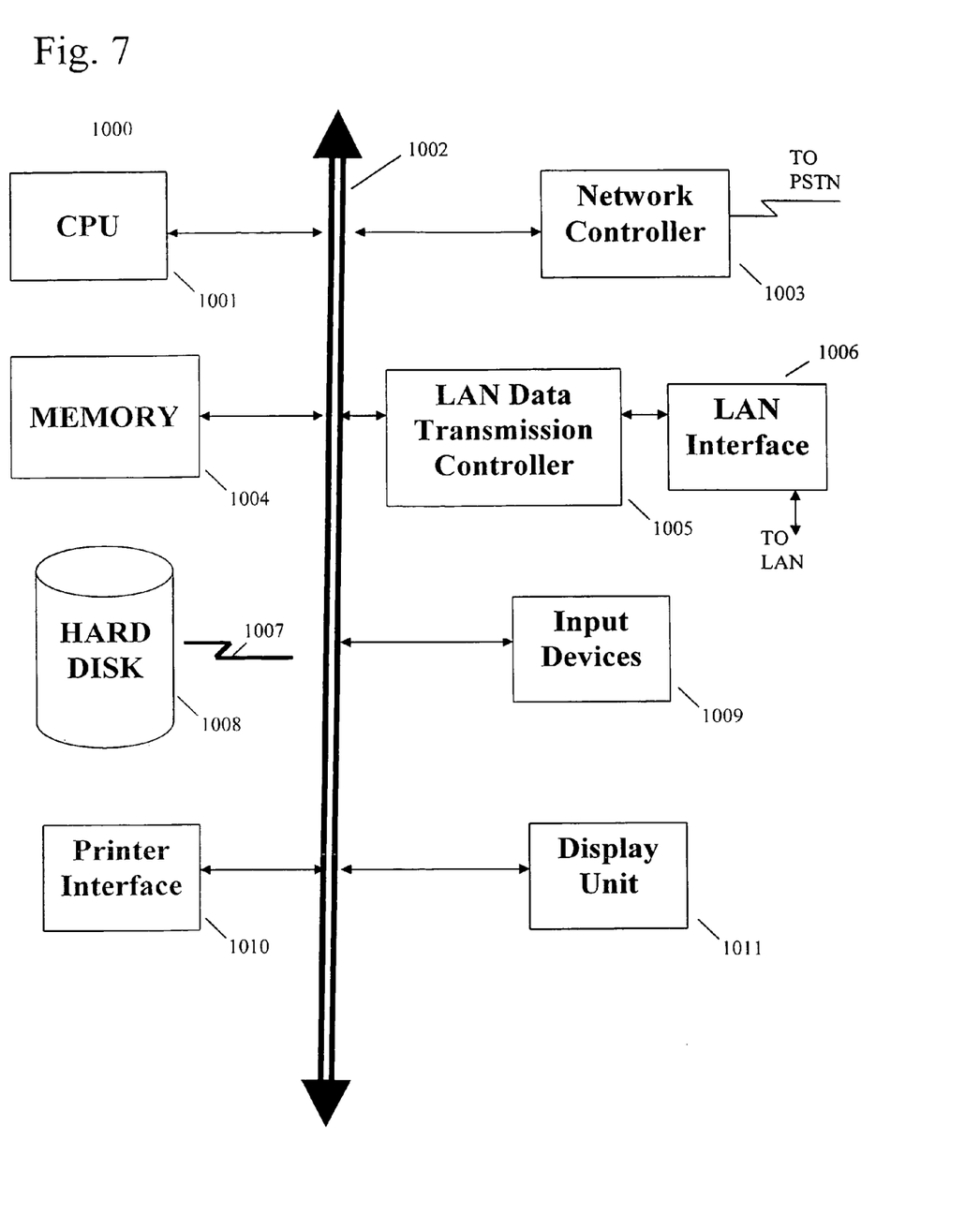
FIG. 7 shows an example of a computer system capable of implementing the method and apparatus according to embodiments of the present disclosure.

FIG. 7 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for connecting to a web service, the method comprising: selecting a web service; selecting a server among one or more servers capable of running the selected web service, the selected server being selected independent of input from a requesting application subsequent to selection of the web service; determining a real address for the selected web service running on the selected server; and connecting to the selected web service running on the selected server using the determined real address.

2. The method of claim 1, wherein selecting a web service comprises searching a directory of web services.

3. The method of claim 2, wherein said directory of web services is a Universal Description Discovery Integration (UDDI) repository.

4. The method of claim 1, wherein selecting a web service comprises providing a public address.

5. The method of claim 1, wherein selecting a server among one or more servers capable of running the selected web service comprises performing a distributed scheduling algorithm.

6. The method of claim 5, wherein the distributed scheduling algorithm is a static algorithm.

7. The method of claim 5, wherein the distributed scheduling algorithm is a dynamic algorithm.

8. The method of claim 5, wherein the distributed scheduling algorithm is a preemptive algorithm.

9. The method of claim 1, wherein selecting a server among one or more servers capable of running the selected web service comprises: becoming aware of the status of a primary server of the one or more servers capable of running the selected web service; selecting the primary server when the primary server has a status of functional; and selecting a secondary server of the one or more servers capable of running the selected web service when the primary server has a status of non-functional.

10. The method of claim 1, wherein determining a real address for the selected web service running on the selected server comprises looking up the real address for the selected web service running on the selected server in a directory of web services.

11. The method of claim 10, wherein said directory of web services is a UDDI repository.

12. The method of claim 1, wherein connecting to the selected web service running on the selected server comprises: establishing a connection between a requesting party and a proxy; establishing a connection between the proxy and the selected web service running on the selected server using the determined real address; allowing the requesting party to connect to the selected web service running on the selected server through the established connection between the requesting party and the proxy and the established connection between the proxy and the selected web service running on the selected server.

13. The method of claim 1, wherein said connecting to the selected web service running on the selected server comprises: providing a requesting party with the real address for the selected web service running on the selected server, and establishing a connection between the requesting party and the selected web service running on the selected server using the determined real address.

14. A computer system comprising: a processor; and a computer recording medium including computer executable code executable by the processor for connecting to a web service, the computer executable code comprising: code for selecting a web service; code for selecting a server among one or more servers capable of running the selected web service, the selected server being selected independent of input from a requesting application subsequent to selection of the web service; code for determining a real address for the selected web service running on the selected server; and code for connecting to the selected web service running on the selected server using the determined real address.

15. The computer system of claim 14, wherein selecting a web service comprises searching a directory of web services.

16. The computer system of claim 15, wherein said directory of web services is a Universal Description Discovery Integration (UDDI) repository.

17. The computer system of claim 14, wherein selecting a web service comprises providing a public address.

18. The computer system of claim 14, wherein selecting a server among one or more servers capable of running the selected web service comprises performing a distributed scheduling algorithm.

19. The computer system of claim 18, wherein the distributed scheduling algorithm is a static algorithm.

20. The computer system of claim 18, wherein the distributed scheduling algorithm is a dynamic algorithm.

21. The computer system of claim 18, wherein the distributed scheduling algorithm is a preemptive algorithm.

22. The computer system of claim 14, wherein the code for selecting a server among one or more servers capable of running the selected web service comprises: code for becoming aware of the status of a primary server of the one or more servers capable of running the selected web service; code for selecting the primary server when the primary server has a status of functional; and code for selecting a secondary server of the one or more servers capable of running the selected web service when the primary server has a status of non-functional.

23. The computer system of claim 14, wherein the code for determining a real address for the selected web service running on the selected server comprises code for looking up the real address for the selected web service running on the selected server in a directory of web services.

24. The computer system of claim 23, wherein said directory of web services is a Universal Description Discovery Integration (UDDI) repository.

25. The computer system of claim 14, wherein said code for connecting to the selected web service running on the selected server comprises: code for establishing a connection between a requesting party and a proxy; code for establishing a connection between the proxy and the selected web service running on the selected server using the determined real address; code for allowing the requesting party to connect to the selected web service running on the selected server through the established connection between the requesting party and the proxy and the established connection between the proxy and the selected web service running on the selected server.

26. The computer system of claim 14, wherein said code for connecting to the selected server comprises: code for providing a requesting party with the real address for the selected web service running on the selected server, and code for establishing a connection between the requesting party and the selected web service running on the selected server using the determined real address.

27. A non-transitory computer recording medium including computer executable code for connecting to a web service, the computer executable code comprising: code for selecting a web service; code for selecting a server among one or more servers capable of running the selected web service, the selected server being selected independent of input from a requesting application subsequent to selection of the web service; code for determining a real address for the selected web service running on the selected server; and code for connecting to the selected web service running on the selected server using the determined real address.

* * * * *